No. 640,649. Patented Jan. 2, 1900.
C. GORMAN.
BICYCLE CRANK SHAFT.
(Application filed Sept. 23, 1898.)
(No Model.)
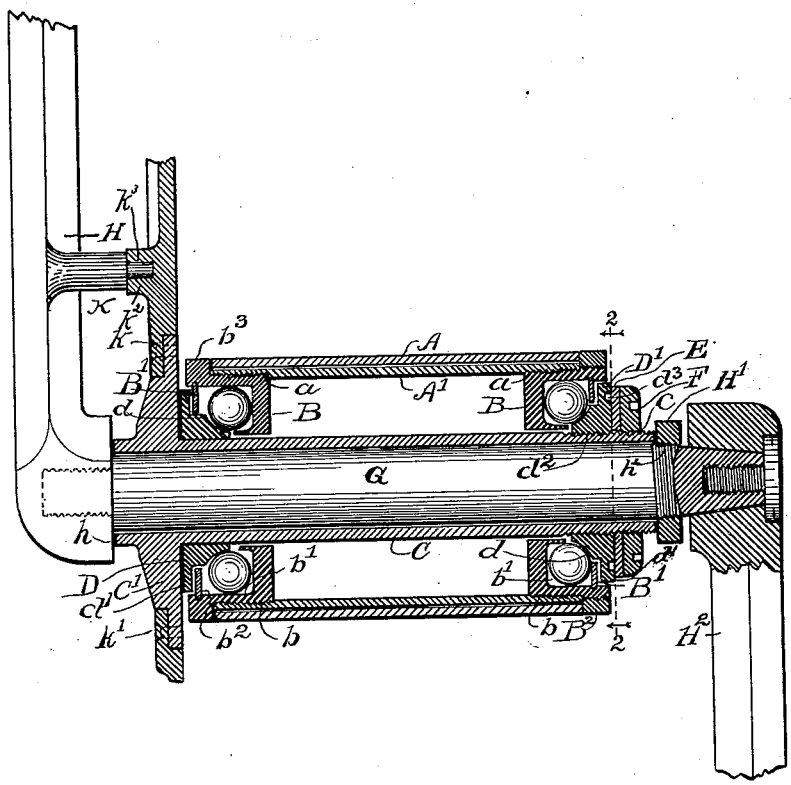
Witnesses:
G. S. Noble,
J. Buehler.
Inventor,
Charles Gorman
by B. Singer.
Att'y.

United States Patent Office.

CHARLES GORMAN, OF CHICAGO, ILLINOIS.

BICYCLE CRANK-SHAFT.

SPECIFICATION forming part of Letters Patent No. 640,649, dated January 2, 1900.

Application filed September 23, 1898. Serial No. 691,715. (No model.)

*To all whom it may concern:*

Be it known that I, CHARLES GORMAN, a subject of the Queen of Great Britain, residing at Chicago, in the county of Cook and State of Illinois, have invented certain new and useful Improvements in Bicycle Crank-Shafts, of which the following is a specification.

My invention relates to the connection between the sprocket-wheel and adjacent crank; and it consists in combining with a sleeve flanged at one end and embracing the axle and bearings in which said sleeve rotates a shouldered crank, against which the flanged end of the sleeve sits, a jam-nut threaded upon the opposite end of the axle to bind the sleeve against the crank, a sprocket-wheel secured to the flange, and a pin upon the crank taking into a recess in the wheel outside of its connection with the flange, to relieve the joint between the flange and wheel of strain.

In the drawing the single figure is a vertical section taken in a plane longitudinal of the crank-axle through a crank-hanger bearing, showing the cranks and a part of the sprocket-wheel broken away.

A represents the hanger-sleeve, and A' is a brass or barrel fitting within this sleeve and having internal screw-threads $a$ at each end. This barrel is or may be equal in length with the hanger-sleeve, and at each end it receives an annular ball-race B, externally screw-threaded at $b$ to take into the adjacent threaded end of the barrel and undercut at $b'$ to form the raceway for the reception of the balls. A split annular ring or washer B' is sprung into an internal annular groove $b^2$ in the race to bar the escape of the balls from the raceway and to serve, in combination with other parts hereinafter described, as a dust-shield or mud-guard. One of the ball-races is provided with an annular shoulder or flange $b^3$, projecting above the threaded periphery to receive the thrust of the adjacent end of the hanger-sleeve and of the barrel when the latter coincides in length with the sleeve. The peripheral threading of the opposite ball-race is unbroken from end to end and receives a jam-nut $B^2$, which binds the sleeve against the annular flange of the first-named race, thereby serving as a lock-nut for both races.

C is a sleeve, hereinafter termed the "bearing-sleeve," having a flange C' at one end and externally screw-threaded, as at $c$, at the other end. Over this sleeve and against the flange fits a bearing-ring D, formed with a grooved way $d$ to ride upon the balls in the contiguous race and with a radial lip $d'$, which overlaps the split washer in said race and coacts therewith to exclude dust and mud. Upon the screw-threaded end of the bearing-sleeve takes a second opposing bearing-ring D', having a like grooved way $d$ and radial rim $d'$, but threaded at $d^2$ to engage the thread upon the sleeve. Provision is made, as indicated at $d^3$, whereby this bearing-ring may be tightened up, thereby forcing the opposing ring against the sleeve-flange and bringing the balls into bearing contact. A washer E and jam-nut F complete the connection between the sleeve and the bearings and serve to maintain the adjustment of the latter.

The axle G passes snugly through the bearing-sleeve and has at one end a crank H, shouldered at $h$ to come against the flanged end of said sleeve, while toward the other end it is screw-threaded, as at $h'$, to receive a jam-nut H', which acts against the adjacent end of the sleeve to bind it against the shoulder afforded by the crank at the opposite end, and thereby lock the axle and the sleeve together. Beyond the screw-threads the axle is diminished, and the second crank $H^2$ is secured thereto in any suitable manner.

The flange C' of the bearing-wheel is provided with a seat $k$ for the sprocket-wheel K, and suitable fastenings $k'$, passing through the flange and wheel, secure them together. To relieve these fastenings of the major portion of the driving strain, the wheel is formed with a boss or socket $k^2$ outside the line of junction with the flange to receive a pin $k^3$, insetting from the adjacent crank. This not only removes the driving strain from the bearing-sleeve to a point approaching the periphery of the sprocket-wheel, but prevents slip between the axle and the sleeve, the same nut that jams them together serving to hold the pin in engagement with the boss, and the removal of the nut and adjacent crank permitting the axle to be instantly unlocked and withdrawn from the sleeve. Thus by removing the nut from the axle the latter is disengaged from the bearing-sleeve. By removing the jam-nut and adjacent bearing-ring from the bearing-sleeve the latter is disengaged and may be withdrawn from the ball-races and their connecting-barrel, and by removing the nut from the unflanged ball-race the barrel, with both ball-races and their charges, may be withdrawn from the hanger-sleeve.

I claim—

The combination with an axle having a shoulder at one end, of a flanged sleeve fitting over the axle and abutting against the shoulder thereon; a sprocket-wheel secured to the flange of the sleeve and having a boss or socket on its outer side; a crank-arm provided with a pin fitting said socket, and a nut arranged on the axle between the end of the sleeve, and the adjacent crank-arm to hold the pin within the socket.

In testimony whereof I affix my signature in presence of two witnesses.

CHARLES GORMAN.

Witnesses:
JOHN D. SLOAN,
G. S. NOBLE.